US012130067B2

(12) United States Patent
Bushnell

(10) Patent No.: US 12,130,067 B2
(45) Date of Patent: Oct. 29, 2024

(54) TRANSPORT REFRIGERATION SYSTEM WITH COUNTER-ROTATING FAN ASSEMBLY

(71) Applicant: CARRIER CORPORATION, Palm Beach Gardens, FL (US)

(72) Inventor: Peter R. Bushnell, Cazenovia, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 21 days.

(21) Appl. No.: 17/888,979

(22) Filed: Aug. 16, 2022

(65) Prior Publication Data
US 2023/0083462 A1 Mar. 16, 2023

Related U.S. Application Data

(60) Provisional application No. 63/242,701, filed on Sep. 10, 2021.

(51) Int. Cl.
*F25D 17/06* (2006.01)
*F25D 11/00* (2006.01)

(52) U.S. Cl.
CPC .......... *F25D 17/067* (2013.01); *F25D 11/003* (2013.01)

(58) Field of Classification Search
CPC .... F04D 29/602; F04D 19/024; F04D 19/007; B60H 1/00464; B60H 1/00014; F25D 11/003; F25D 17/067
See application file for complete search history.

(56) References Cited

U.S. PATENT DOCUMENTS 2,696,084 A * 12/1954 Kirkpatrick ........... F25D 11/003
62/243
3,971,877 A * 7/1976 Lee ........................ B01D 46/00
55/491

(Continued)

FOREIGN PATENT DOCUMENTS

CN 207945737 U 10/2018
CN 208108331 U 11/2018
(Continued)

OTHER PUBLICATIONS

Extended European Search Report for Application No. EP 22 19 4823.5 dated Apr. 18, 2023.
(Continued)

*Primary Examiner* — Ana M Vazquez
(74) *Attorney, Agent, or Firm* — Carlson, Gaskey & Olds, P.C.

(57) ABSTRACT

An illustrative example embodiment of a transport refrigeration system includes an evaporator air management system having an evaporator heat exchanger and an air passage downstream of the evaporator heat exchanger. A two-stage fan assembly within the air passage includes a first fan stage having a first fan rotor, a first motor associated with the first fan rotor for selectively causing the first fan rotor to rotate in a first direction about a fan axis, a second fan stage having a second fan rotor in series with the first fan rotor, and a second motor associated with the second fan rotor for selectively causing the second fan to rotate in a second, opposite direction about the fan axis. The first and second fan stages draw air across the evaporator heat exchanger and through the air passage.

14 Claims, 2 Drawing Sheets

(56) References Cited

U.S. PATENT DOCUMENTS

| | | | |
|---|---|---|---|
| 4,365,484 A | 12/1982 | Carson et al. | |
| 4,770,002 A | 9/1988 | Viegas et al. | |
| 4,878,360 A | 11/1989 | Viegas | |
| 4,922,727 A | 5/1990 | Viegas | |
| 7,156,611 B2 | 1/2007 | Oosawa et al. | |
| 7,445,423 B2 | 11/2008 | Ishihara et al. | |
| 7,872,381 B2 | 1/2011 | Watanabe et al. | |
| 8,133,006 B2 | 3/2012 | Yoshida | |
| 8,172,501 B2 | 5/2012 | Nishizawa et al. | |
| 8,226,350 B2 | 7/2012 | Hayashigaito et al. | |
| 8,556,593 B2 | 10/2013 | Osawa et al. | |
| 8,951,012 B1 | 2/2015 | Santoro | |
| 9,416,982 B2 | 8/2016 | Kim et al. | |
| 10,408,523 B2 | 9/2019 | Cresswell et al. | |
| 10,837,448 B2 | 11/2020 | Kato et al. | |
| 2003/0026699 A1 | 2/2003 | Stairs et al. | |
| 2005/0215189 A1* | 9/2005 | Nelson | B60H 1/00014 |
| | | | 454/118 |
| 2009/0175745 A1 | 7/2009 | Usami | |
| 2010/0260616 A1* | 10/2010 | Osawa | F04D 19/024 |
| | | | 417/53 |
| 2011/0011115 A1 | 1/2011 | Bushnell | |
| 2014/0130535 A1 | 5/2014 | Santoro | |
| 2015/0121923 A1* | 5/2015 | Rusignuolo | B60H 1/00428 |
| | | | 62/428 |
| 2019/0078839 A1 | 3/2019 | Sun | |
| 2020/0056618 A1 | 2/2020 | Decker | |
| 2020/0149537 A1* | 5/2020 | Takemoto | F04D 19/024 |

FOREIGN PATENT DOCUMENTS

| | | |
|---|---|---|
| CN | 208108332 U | 11/2018 |
| CN | 109458663 A | 3/2019 |
| CN | 209763304 U | 12/2019 |
| CN | 109405208 B | 10/2020 |
| CN | 113123977 A | 7/2021 |
| DE | 102019123687 A1 | 3/2021 |
| EP | 2354685 B1 | 7/2015 |
| WO | 2009014514 A1 | 1/2009 |

OTHER PUBLICATIONS

Partial European Search Report for Application No. EP 22194823.5 dated Jan. 17, 2023.

* cited by examiner

TRANSPORT REFRIGERATION SYSTEM WITH COUNTER-ROTATING FAN ASSEMBLY

CROSS REFERENCE TO RELATED APPLICATION

This application claims priority to U.S. Provisional Application No. 63/242,701, which was filed on Sep. 10, 2021, and is incorporated herein by reference.

BACKGROUND

Transport refrigeration systems have been in use for many years to control the temperature within a transport container, such as a truck trailer. Of course, maintaining a desired temperature of the cargo within the refrigerated compartment is a primary goal. Achieving that goal requires adequate airflow and pressure performance, especially for a relatively large refrigerated space. The refrigeration system would ideally be as compact and lightweight as possible while still providing the necessary output to maintain the desired temperature within the refrigerated space. Additionally, power consumption would ideally be kept at a minimum.

SUMMARY

An illustrative example embodiment of a transport refrigeration system includes an evaporator air management system having an evaporator heat exchanger and an air passage downstream of the evaporator heat exchanger. A two-stage fan assembly within the air passage includes a first fan stage having a first fan rotor, a first motor associated with the first fan rotor for selectively causing the first fan rotor to rotate in a first direction about a fan axis, a second fan stage having a second fan rotor in series with the first fan rotor, and a second motor associated with the second fan rotor for selectively causing the second fan to rotate in a second, opposite direction about the fan axis. The first and second fan stages draw air across the evaporator heat exchanger and through the air passage.

In addition to one or more of the features described above, or as an alternative, the fan axis is vertical.

In addition to one or more of the features described above, or as an alternative, each fan rotor has a tip diameter in a range of 300 mm to 400 mm, and each fan rotor has a hub-to-tip diameter ratio in a range of 0.4 to 0.5.

In addition to one or more of the features described above, or as an alternative, the first motor is supported by radial struts upstream of the first fan rotor, where second motor is supported by radial struts downstream of the second fan rotor.

In addition to one or more of the features described above, or as an alternative, the transport refrigeration system includes a controller that causes the first motor to rotate the first fan rotor at a first speed and causes the second motor to rotate the second fan rotor at a second speed.

In addition to one or more of the features described above, or as an alternative, the controller varies a speed of rotation of at least one of the fan rotors.

In addition to one or more of the features described above, or as an alternative, the first speed is different than the second speed.

In addition to one or more of the features described above, or as an alternative, the air passage includes a portion having an inside dimension corresponding to an outside dimension of the first fan stage and the air passage includes an outlet that has an inside dimension that is larger than the inside dimension of the portion of the air passage.

In addition to one or more of the features described above, or as an alternative, the portion of the air passage is parallel to the fan axis, the fan axis is vertical, and the outlet directs airflow in a direction that is transverse to the fan axis.

In addition to one or more of the features described above, or as an alternative, the evaporator heat exchanger has a cross-sectional area that is larger than the inside dimension of the portion of the air passage.

In addition to one or more of the features described above, or as an alternative, the transport refrigeration system includes an air distribution system that includes a plurality of vents to distribute air to a corresponding plurality of different locations within a trailer.

In addition to one or more of the features described above, or as an alternative, the first motor and the second motor are each DC powered devices.

The various features and advantages of at least one disclosed example embodiment will become apparent to those skilled in the art from the following detailed description. The drawings that accompany the detailed description can be briefly described as follows.

DETAILED DESCRIPTION

Figure 1:
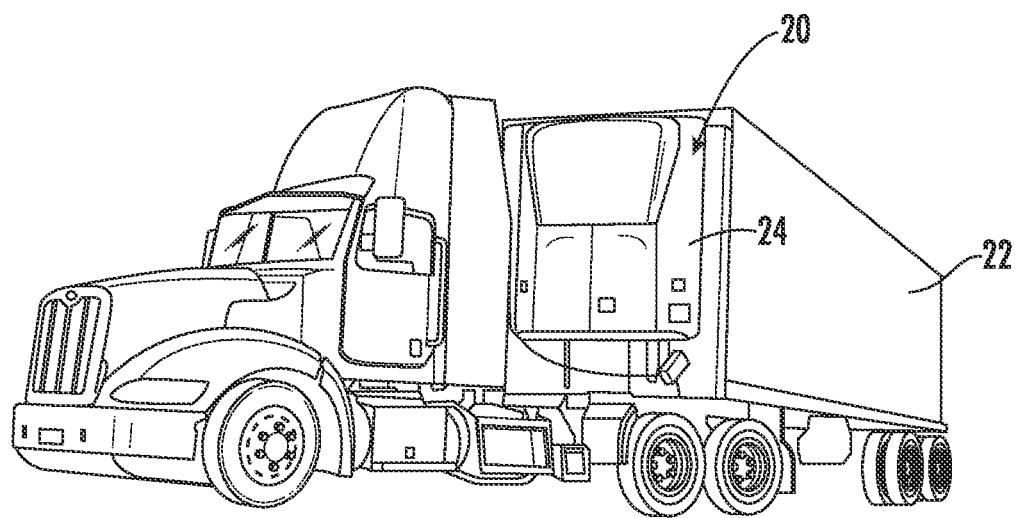
FIG. 1 diagrammatically illustrates a truck and trailer including an example embodiment of a transport refrigeration system.

FIG. 1 shows a transport refrigeration system 20 for maintaining a desired temperature within a container 22. In the illustrated example embodiment, the container 22 is a truck trailer and the transport refrigeration system 20 is mounted on a front end of the truck trailer 22. The transport refrigeration system 20 includes a refrigeration circuit and provides cool air within the trailer 22.

Figure 2:
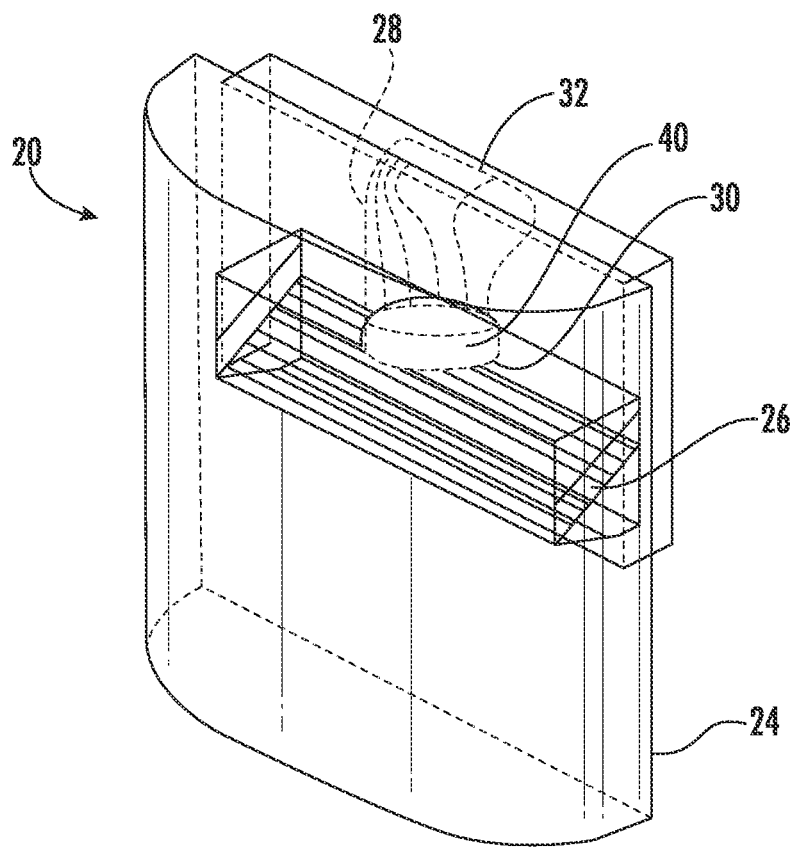
FIG. 2 schematically illustrates selected features of the evaporator air management system of the transport refrigeration system shown in FIG. 1.
Figure 3:
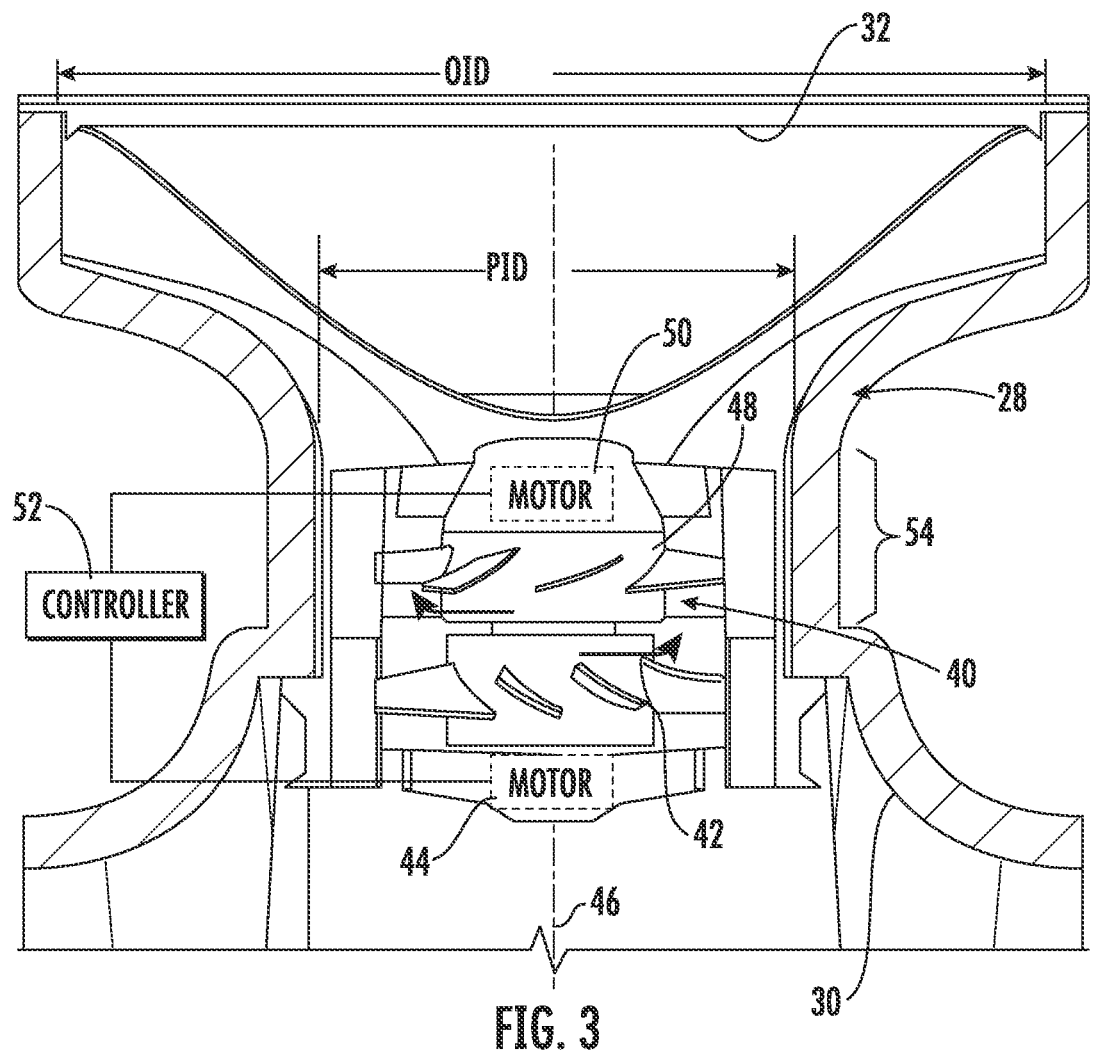
FIG. 3 is partially cut-away view schematically illustrating selected portions of the counter-rotating fan assembly in the transport refrigeration system shown in FIG. 1.

FIGS. 2 and 3 illustrate selected portions of the transport refrigeration system 20. A housing 24 surrounds an evaporator air management system including an evaporator heat exchanger 26. Other portions of the refrigeration circuit, such as the compressor and condenser, are not illustrated. An air passage 28, which is part of the evaporator air management system includes an inlet 30 near one end of the air passage 28 and an outlet 32 near an opposite end. A fan assembly 40 is situated within the air passage 28.

As best seen in FIG. 3, the fan assembly 40 is a two-stage fan assembly. A first fan stage 42 includes a first fan rotor within the air passage 28. A first motor 44 associated with the first fan stage 42 selectively causes the first fan rotor to rotate in a first direction about a fan axis 46. A second fan stage 48 including a second fan rotor is situated within the air passage 28 coaxially aligned in series with the first fan stage 42. A second motor 50 is associated with the second fan stage 48 to cause the second fan rotor to rotate in a second, opposite direction about the fan axis 46.

In an example embodiment, the first motor 44 and the second motor 50 are each direct current (DC) powered devices. In some embodiments the first motor 44 and the second motor 50 are each DC motors. In another embodiment, at least one of the first motor 44 or the second motor 50 is an alternating current (AC) motor.

The two-stage fan assembly 40 is situated downstream of the evaporator heat exchanger 26 to draw air across the evaporator heat exchanger 26, through the air passage 28, and out of the outlet 32. All of the air that moves through the evaporator air management system passes through the two-stage fan assembly 40. The two-stage action of the coaxial and in-series first fan stage 42 and second fan stage 48 gives high pressure flow performance for purposes of moving air through the evaporator air management system and distributing cooled air within the conditioned space, such as the interior of the trailer 22 (FIG. 1). By rotating in opposite directions, the rotor of the second fan stage 48 effectively cancels (or at least reduces) swirl induced in the air flowing through the air passage 28, which is caused by the rotation of the rotor of the first fan stage 42. This reduces the need for straightener vanes, which are commonly used. The counter-rotating fan rotors also provide increased air pressure while requiring less power. The combined effect of the two fan stages 42, 48 allows for achieving a desired pressure performance at a lower fan and motor speed than would otherwise be required if a single stage fan were used.

A controller 52 includes a processor and memory configured to selectively control operation of the first motor 44 and the second motor 50. The controller 52 causes the motors 44 and 50 to operate at a speed to achieve desired airflow and pressure for delivering cooled air through the outlet 32. The controller 52 in some embodiments controls the first motor 44 to rotate at a first speed and the second motor 50 to rotate at a second speed. The first speed may be different than the second speed. One of the first speed or the second speed may be a varying speed. In some embodiments, the first speed and the second speed are fixed and approximately equal for most operating conditions of the transport refrigeration system 20.

One aspect of the counter-rotating fan stages 42, 48 of the fan assembly 40 is that the fans are coaxial and the fan axis 46 is vertical. The outlet 32 delivers airflow in a direction that is transverse to the fan axis 46. In some embodiments, the air passage 28 includes an approximately 90° bend between a vertical portion 54 of the air passage 28 and the outlet 32. In the illustrated arrangement, the fan stages 42, 48 are both within the portion 54. The counter-rotating first fan stage 42 and second fan stage 48 with their respective, associated motors, are capable of causing air movement through the air passage 28 in a manner that produces sufficient air delivery through the outlet 32 even with the transverse orientation of the outlet 32 relative to the fan axis 46. In some embodiments, the evaporator air management system and the air passage 28 are designed consistent with the teachings of the published international application WO 2009/014514. The entire contents of that application are incorporated by reference.

As can be appreciated from FIG. 3, the portion 54 of the air passage 28 has an inside dimension PID that is approximately the same as an outside dimension of the fan assembly 40. The outlet 32 includes an inside dimension OID that is larger than the inside dimension PID of the portion 54. The evaporator 26 has a cross-sectional area that is also larger than the inside dimension PID of the portion 54. The first fan 42 and second fan 48 cause sufficient airflow across the evaporator 26 and through the outlet 32 to provide adequate cooling within a space, such as the trailer 22.

Having the first fan 42 in series with the second fan 48 and coaxially aligned with each other about the fan axis 46 allows the fan assembly 40 to be fit within the relatively smaller area of the portion 54 of the air passage 28. In some embodiments, each fan rotor has a tip diameter in the range of 300 mm to 400 mm, and each fan rotor has a hub-to-tip diameter ratio in the range of 0.4 to 0.5.

The two-stage, counter-rotating fan 40 allows for utilizing relatively small DC powered devices as the fan motors, which can be powered by a battery or other power system. In the illustrated embodiment, the first motor 44 is supported by radial struts upstream of the first fan rotor and the second motor 50 is supported by radial struts downstream of the second fan rotor.

Figure 4:
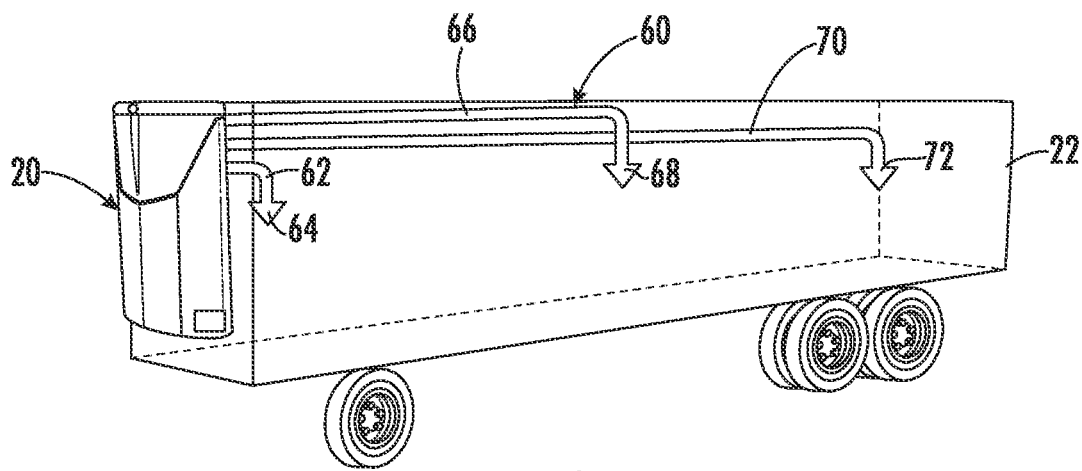
FIG. 4 schematically illustrates an example configuration of air distribution within a trailer.

FIG. 4 schematically illustrates an air distribution system 60 within a trailer 22. As mentioned above, the transport refrigeration system 20 may be used in conjunction with other containers or storage vessels in need of a conditioned environment, such as shipping containers. As shown in FIG. 4, the air distribution system 60 is configured to deliver cooled air to different sections or locations within the interior of the trailer 22. For example, a first duct 62 includes a first vent 64 to provide cooled air to a forward section inside the trailer 22. A second duct 66 and second vent 68 are situated to deliver cooled air to a central portion of the trailer 22. A third duct 70 and third vent 72 are situated to deliver cooled air to a rearward section inside the trailer 22. The throw of the fan assembly 40 establishes sufficient pressure without introducing significant swirl to deliver sufficient airflow and pressure through the outlet 32 to adequately provide cooling through each of the vents 64, 68, and 72. The first motor 44 and second motor 50 can operate at a relatively lower speed and consume relatively less energy than a single motor associated with a single fan and the fan assembly 40 is more effective at achieving a desired level of cooling throughout the entire interior of the trailer 22.

The preceding description is exemplary rather than limiting in nature. Variations and modifications to the disclosed examples may become apparent to those skilled in the art that do not necessarily depart from the essence of this invention. The scope of legal protection given to this invention can only be determined by studying the following claims.

I claim:

1. A transport refrigeration system, comprising:
an evaporator air management system including an evaporator heat exchanger and an air passage downstream of the evaporator heat exchanger;
a two-stage fan assembly within the air passage, the two-stage fan assembly including a first fan stage having a first fan rotor, a first motor associated with the first fan rotor for selectively causing the first fan rotor to rotate in a first direction about a fan axis, a second fan stage having a second fan rotor in series with the first fan rotor, and a second motor associated with the second fan rotor for selectively causing the second fan stage to rotate in a second, opposite direction about the fan axis, the first and second fan stages drawing air across the evaporator heat exchanger and through the air passage;
the air passage defined within an outer wall having an inlet portion, a central portion, and an outlet portion, wherein the central portion has an inside dimension corresponding to an outside dimension of the first fan stage;

the inlet portion has an inside dimension that is larger than the inside dimension of the central portion;

the outlet portion has an inside dimension that is larger than the inside dimension of the central portion; and the first and second fan stages are both within the central portion, and wherein the first motor is positioned in the inlet portion and the second motor is positioned in the central portion.

2. The transport refrigeration system of claim 1, wherein the fan axis is vertical.

3. The transport refrigeration system of claim 2, wherein each fan rotor has a tip diameter in a range of 300 mm to 400 mm, and each fan rotor has a hub-to-tip diameter ratio in a range of 0.4 to 0.5.

4. The transport refrigeration system of claim 2, wherein the first motor in the inlet portion is supported by radial struts upstream of the first fan rotor, and where second motor is supported by radial struts downstream of the second fan rotor such that the first fan stage and the second fan stage are positioned axially between the first motor and the second motor.

5. The transport refrigeration system of claim 1, comprising a controller that causes the first motor to rotate the first fan rotor at a first speed and causes the second motor to rotate the second fan rotor at a second speed.

6. The transport refrigeration system of claim 5, wherein the controller varies a speed of rotation of at least one of the first and second fan rotors.

7. The transport refrigeration system of claim 5, wherein the first speed is different than the second speed.

8. The transport refrigeration system of claim 7, wherein the evaporator heat exchanger has a cross-sectional area that is larger than the inside dimension of the central portion of the air passage.

9. The transport refrigeration system of claim 1, wherein:

the central portion of the air passage is parallel to the fan axis;

the fan axis is vertical; and the outlet portion directs airflow in a direction that is transverse to the fan axis.

10. The transport refrigeration system of claim 1, wherein the evaporator heat exchanger has a cross-sectional area that is larger than the inside dimension of the central portion of the air passage.

11. The transport refrigeration system of claim 1, comprising an air distribution system that includes a plurality of vents to distribute air to a corresponding plurality of different locations within a trailer.

12. The transport refrigeration system of claim 11, wherein the trailer extends in a longitudinal direction along a length, and including a plurality of ducts associated with the plurality of vents, wherein each duct extends to a different position along the length such that each vent is at a different longitudinal position within the trailer.

13. The transport refrigeration system of claim 12, wherein the plurality of ducts comprises at least a first duct, a second duct, and a third duct, and wherein the plurality of vents comprises at least a first vent, a second vent, and a third vent, and wherein the first duct extends to the first vent to provide cooled air to a forward section inside the trailer, the second duct extends to the second vent to provide cooled air to a central portion inside the trailer, and the third duct extends to the third vent to provide cooled air to a rearward section inside the trailer.

14. The transport refrigeration system of claim 1, wherein the first motor and the second motor are each DC powered devices.

\* \* \* \* \*